United States Patent [19]

Seto et al.

[11] Patent Number: 4,802,618
[45] Date of Patent: Feb. 7, 1989

[54] LIGHTTIGHT ENVELOPE FOR HIGH-SPEED CONVEYANCE OF STIMULABLE PHOSPHOR SHEET

[75] Inventors: Kimio Seto; Makoto Ohgoda, both of Kanagawa, Japan

[73] Assignee: Fuji Photo Film Co., Ltd., Kanagawa, Japan

[21] Appl. No.: 666,807

[22] Filed: Oct. 31, 1984

[30] Foreign Application Priority Data

Nov. 2, 1983 [JP] Japan .................. 58-206556

[51] Int. Cl.⁴ .............................................. B65D 27/00
[52] U.S. Cl. ................................. 229/68 R; 206/554; 206/454; 206/455; 229/97.1; 229/77
[58] Field of Search ................ 383/95, 59, 57, 66, 383/67, 93, 68, 69, 107, 123; 206/455, 456, 809; 229/77, 79, 68 R, 87.5, 82, 92, 92.1, 92.7, 92.8, 5.7

[56] References Cited

U.S. PATENT DOCUMENTS

| | | | |
|---|---|---|---|
| 3,588,456 | 6/1971 | McNabb | 229/68 R |
| 3,640,450 | 2/1972 | Lieberman | 206/554 |
| 3,958,693 | 5/1976 | Greene | 383/69 |
| 4,079,767 | 3/1978 | Howard | 383/95 |
| 4,186,868 | 2/1980 | Coleman | 229/92.1 |
| 4,200,189 | 4/1980 | Hagelberg | 229/68 R |
| 4,322,001 | 3/1982 | Hurley | 206/455 |
| 4,438,164 | 3/1984 | Pfeifer et al. | 206/455 |
| 4,603,260 | 7/1986 | Kaisei | 206/454 |

Primary Examiner—Willis Little
Attorney, Agent, or Firm—Sughrue, Mion, Zinn, Macpeak & Seas

[57] ABSTRACT

A lighttight envelope for housing a stimulable phosphor sheet therein is fabricated of a flexible light shielding material and has a size sufficient to house the stimulable phosphor sheet therein. The lighttight envelope comprises an upper sheet and a lower sheet closely contacted with each other at least at one side and open at least at one side opposite to the closely contacted side and at portions of two sides adjacent the ends of the opposite side up to such positions that access to a part of the stimulable phosphor sheet housed in the lighttight envelope is allowed, thereby forming a wide inlet for the stimulable phosphor sheet. A small face-to-face fastener is positioned at a part of the opposite side.

9 Claims, 3 Drawing Sheets

FIG. IA
PRIOR ART
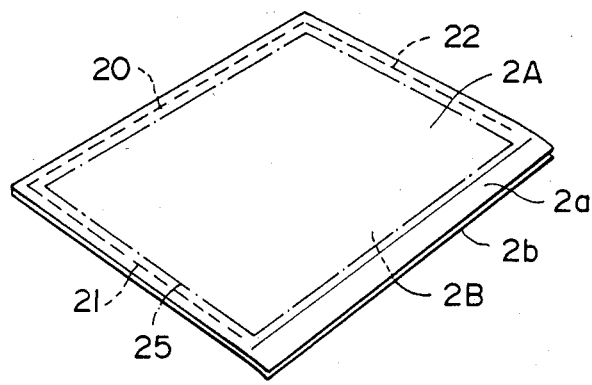
FIG. IB
PRIOR ART
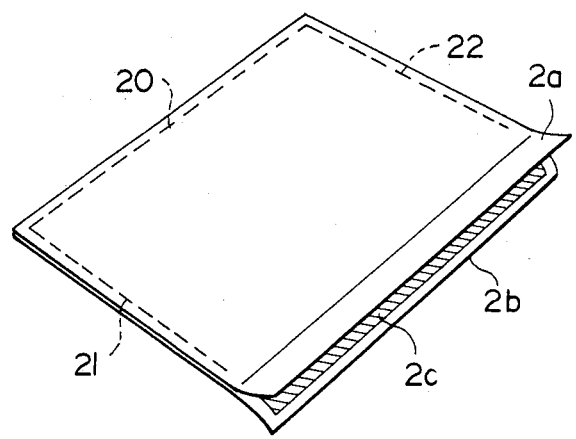

F I G. 4A
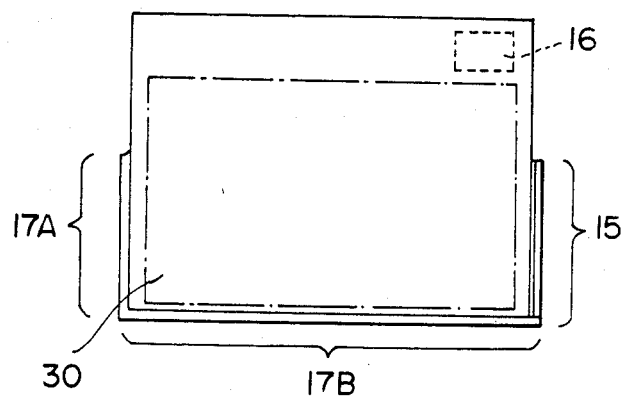
F I G. 4B
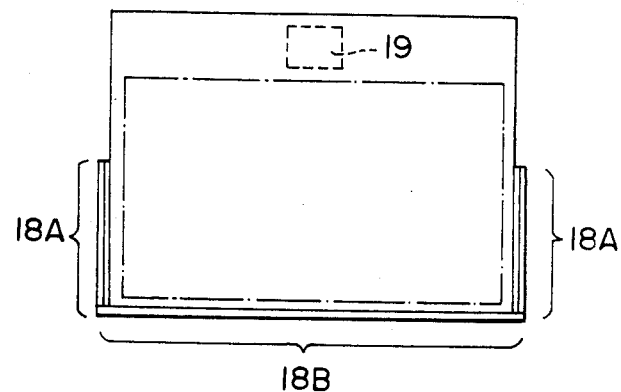
F I G. 4C
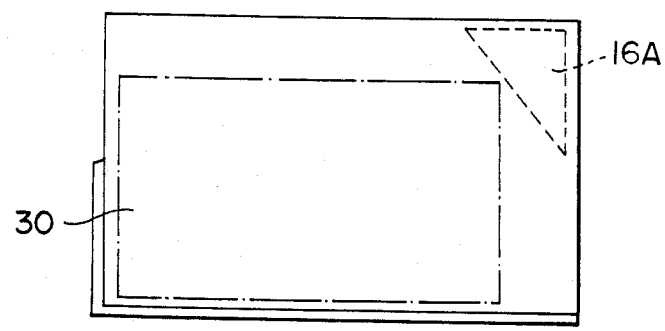

LIGHTTIGHT ENVELOPE FOR HIGH-SPEED CONVEYANCE OF STIMULABLE PHOSPHOR SHEET

BACKGROUND OF THE INVENTION

1. Field of the Invention

This invention relates to a lighttight envelope used when a stimulable phosphor sheet used in a radiation image recording and reproducing system for recording a radiation image in the stimulable phosphor sheet and then reproducing a visible image therefrom is conveyed in a high-speed image recording apparatus. This invention particularly relates to a lighttight envelope for high-speed conveyance of the stimulable phosphor sheet, which has a configuration for improving the operating efficiency in handling of the stimulable phosphor sheet.

2. Description of the Prior Art

High-speed image recording apparatuses have heretofore been used for angiography and the like. The high-speed image recording apparatuses record X-ray images of objects on many X-ray films by sequentially projecting the X-ray images onto the X-ray films. The apparatuses are suitable particularly for sequentially recording angiograms, which change from time to time, on many X-ray films when the diffusion speed of the contrast media is different among the objects.

In the high-speed image recording apparatuses, the X-ray film is used in the form sandwiched, for example, between two intensifying screens and housed in a flexible lighttight envelope.

The high-speed image recording apparatus using a lighttight envelope in which an X-ray film is housed comprises a first film receiving section for receiving the unexposed lighttight envelopes, a conveyance mechanism for sequentially conveying the lighttight envelopes at high speeds from the first film receiving section to an image recording position where the X-ray films are exposed to X-rays passing through an object, and for sequentially conveying the exposed lighttight envelopes at high speeds from the image recording position, and a second film receiving section for receiving the exposed lighttight envelopes which are conveyed at high speeds from the image recording position. The object is positioned on the high-speed image recording apparatus.

The lighttight envelope used in the high-speed image recording apparatus constituted as described above has a configuration for sufficiently shielding the X-ray film from light. FIG. 1A is a perspective view showing an example of the lighttight envelope employed in the conventional high-speed image recording apparatus using an X-ray film, and FIG. 1B is a perspective view showing the lighttight envelope of FIG. 1A with the inlet opened. Sufficiently lighttight, black plastic sheets 2A and 2B are heat-sealed at their sides 20, 21 and 22 to form an envelope open at one side. The open side of the plastic sheet 2A continues into an opening edge portion 2a, and the open side of the plastic sheet 2B continues into an opening edge portion 2b. A face-to-face fastener 2c consisting of a tape provided with many fine hook-like fibers and a tape provided with many fine loop-like fibers is positioned so that the tapes extend on the inner surfaces of the opening edge portions 2a and 2b over the entire lengths thereof. The opening edge portions 2a and 2b are lighttightly engaged with each other by the face-to-face fastener 2c. As indicated by a chain line in FIG. 1A, an X-ray film 25 sandwiched between a pair of intensifying screens (not shown) is housed inside of the sealed sides 20, 21 and 22 and the face-to-face fastener 2c. Thus the X-ray film 25 is handled and conveyed in a condition sufficiently shielded from light.

The conventional lighttight envelope as described above houses the X-ray film 25 in the sufficiently lighttight condition and is loaded into the high-speed image recording apparatus. However, since the face-to-face fastener 2c positioned at the opening edge portions 2a and 2b for securing sufficient lighttightness strongly closes the opening through which the X-ray film 25 is inserted into and removed from the lighttight envelope and since the area of the opening is small, insertion and removal of the X-ray film 25 are not easy to conduct.

Recently, a radiation image recording and reproducing system using a stimulable phosphor as described below has been proposed.

When certain kinds of phosphors are exposed to a radiation such as X-rays, α-rays, β-rays, γ-rays, cathode rays or ultra-violet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibitinhg such properties is referred to as a stimulable phosphor.

As disclosed in U.S. Pat. No. 4,258,264 and Japanese Unexamined patent publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object to have a radiation image stored therein, and is then scanned with stimulating rays such as a laser beam which cause it to emit light in the pattern of the stored image. The light emitted by the stimulable phosphor sheet upon stimulation thereof is photoelectrically detected and converted to an electric image signal, which is processed as desired to reproduce a visible image on a recording medium such as photographic film or on a display device such as a cathode ray tube (CRT).

This radiation image recording and reproducing system using the stimulable phosphor sheet is advantageous over conventional radiography using an X-ray film and intersifying screens in that the radiation image can be recorded over a very wide range (latitude) of radiation exposure and further in that the electric signal used for reproducing the visible image can be freely processed to improve the image quality for viewing, particularly for diagnostic purposes. In more detail, since the amount of light emitted upon stimulation after the radiation energy is stored in the phosphor varies over a very wide range in proportion to the amount of energy stored therein, it is possible to obtain an image having desired density regardless of the amount of exposure of the phosphor to the radiation by reading out the emitted light with an appropriate read-out gain and converting it to an electric signal to reproduce a visible image on a recording medium or a display device. The electric signal may further be processed as desired to obtain a radiation image suitable for viewing, particularly for diagnostic purposes. This is very advantageous in practical use.

Also in the aforesaid radiation image recording and reproducing system using the stimulable phosphor sheet, if such a high-speed image recording apparatus as used in the conventional radiography could be employed, it would become possible to quickly record many radiation images having an improved image quality, particularly a high diagnostic efficiency and accuracy. This would be very advantageous for medical diagnosis.

As mentioned above, the high-speed image recording apparatus is suitable particularly for angiography. Therefore, if the high-speed image recording apparatus could be employed for the radiation image recording and reproducing system using the stimulable phosphor sheet, it would become possible to further improve the diagnostic efficiency and accuracy of angiograms. This would be very advantageous for medical diagnosis.

Accordingly, it is desired to use the aforesaid lighttight envelope for the X-ray film in the high-speed image recording apparatus employed for the radiation image recording and reproducing system, and to load the stimulable phosphor sheet into the high-speed image recording apparatus in the form housed in the lighttight envelope.

However, the aforesaid lighttight envelope is not convenient for inserting the stimulable phosphor sheet thereinto and removing it therefrom at a high operating efficiency. Further, in the radiation image recording and reproducing system using the stimulable phosphor sheet, the stimulable phosphor sheet need not be shielded from light before an X-ray image is recorded thereon. Also, the required degree of light shielding for the stimulable phosphor sheet after an X-ray image is recorded thereon is far lower than the degree of light shielding required for the X-ray film. Therefore, it is not advantageous from the viewpoint of operating efficiency to employ the conventional lighttight envelope for the X-ray film directly as a lighttight envelope for the stimulable phosphor sheet.

In view of the aforesaid feature of the radiation image recording and reproducing system using the stimulable phosphor sheet, a need exists for a lighttight envelope for high-speed conveyance of the stimulable phosphor sheet, which exhibits a comparatively simple light shielding function and which has a configuration facilitating insertion and removal of the stimulable phosphor sheet.

SUMMARY OF THE INVENTION

The primary object of the present invention is to provide a lighttight envelope which has a comparatively simple light shielding function, and which enables easy insertion and removal of a stimulable phosphor sheet.

Another object of the present invention is to provide a lighttight envelope which is suitable for use in the high-speed image recording apparatus.

The present invention provides a lighttight envelope for high-speed conveyance of a stimulable phosphor sheet, which is fabricated of a flexible light shielding material and has a size sufficient to house the stimulable phosphor sheet therein, the lighttight envelope comprising:

(i) an upper sheet and a lower sheet having approximately identical rectangular shapes, said upper sheet and said lower sheet being closely contacted with each other at least at one side thereof and open at least at one side opposite to said closely contacted side and at portions of two sides adjacent the ends of said opposite side up to such positions that access to a part of the stimulable phosphor sheet housed in the lighttight envelope is allowed, and (ii) a means for preventing said upper sheet and said lower sheet from separating from each other, said means being positioned at a part of said opposite side.

The term "close contact" also embraces the case where the upper sheet and the lower sheet are joined together by folding.

As the means for preventing the upper sheet and the lower sheet from separating from each other, any means may be employed insofar as the upper sheet and the lower sheet can be easily engaged releasably with each other and prevented from naturally separating from each other.

In the lighttight envelope of the present invention, since the envelope has a wide opening, it is easy to insert a stimulable phosphor sheet into the envelope and to remove the stimulable phosphor sheet therefrom. Further, since the envelope exhibits lighttightness to a reasonable extent, it can be directly used in the high-speed image recording apparatus. The lighttight envelope also has the effect of protecting the surface of the stimulable phosphor sheet.

BRIEF DESCRIPTION OF THE DRAWINGS

FIG. 1A is a perspective view showing the conventional lighttight envelope used in the conventional high-speed image recording apparatus using X-ray films, FIG. 1B is a perspective view showing the lighttight envelope of FIG. 1A with the inlet opened.

DESCRIPTION OF THE PREFERRED EMBODIMENTS

The present invention will hereinbelow be described in further detail with reference to the accompanying drawings.

Figure 2:
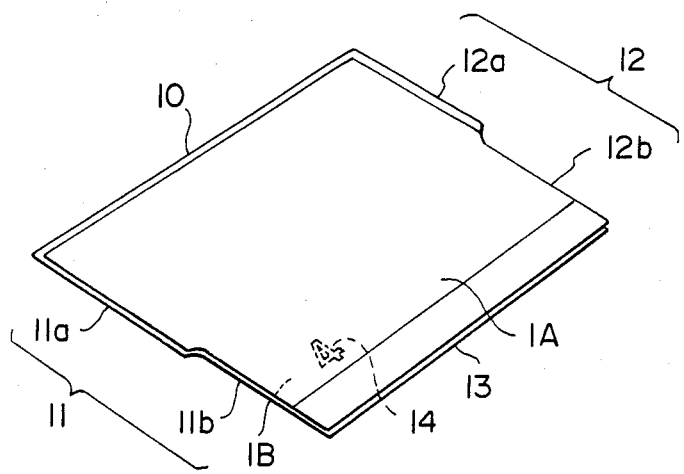
FIG. 2 is a perspective view showing an embodiment of the lighttight envelope in accordance with the present invention.
Figure 3:
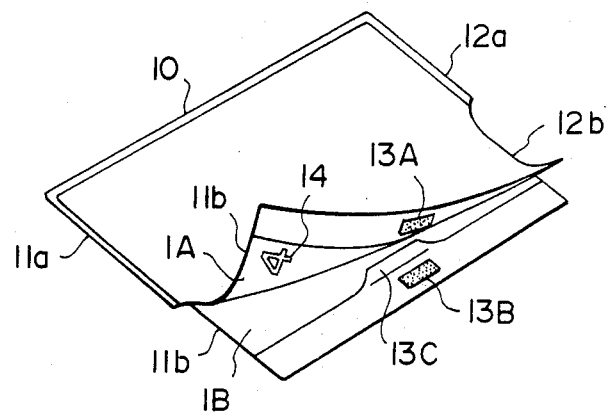
FIG. 3 is a perspective view showing the lighttight envelope of FIG. 2 with the inlet opened.
Figure 3A:
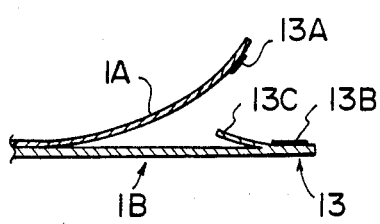
FIG. 3A is a partial sectional view showing the lighttight envelope of FIG. 3.

FIG. 2 is a view of an embodiment of the lighttight envelope in accordance with the present invention with the inlet closed, and FIG. 3 is a view thereof with the inlet opened. The lighttight envelope comprises an upper sheet 1A and a lower sheet 1B made of a flexible light-shielding material and having approximately identical rectangular shapes. The upper sheet 1A and the lower sheet 1B are heat-sealed together at one side 10 and at portions 11a and 12a of sides 11 and 12 adjacent the side 10. A side 13 opposite to the side 10 is left open. Also, a portion 11b of the side 11 and a portion 12b of the side 12, which are adjacent the opposite side 13, are left open from said opposite side 13 up to such positions that access to a part of the stimulable phosphor sheet housed in the lighttight envelope is allowed. A face 13A provided with many fine hook-like fibers is positioned on the inner surface of the upper sheet 1A at the opened side 13. A face 13B provided with many fine loop-like fibers is positioned on the inner surface of the lower sheet 1B at the open side 13. The faces 13A and 13B together constitute a face-to-face fastener for releasably closing the upper sheet 1A and the lower sheet 1B at the open side 13. Further, the inner surface of the lower sheet 1B at the open side 13 is provided with a flap 13C facing inward for contracting or engaging with the stimulable phosphor sheet housed in the lighttight envelope, thereby securely preventing the stimulable phosphor sheet from coming out of the lighttight envelope.

The lighttight envelope is provided with an identification number indicating section 14 made of lead or a material impermeable or semi-impermeable to X-rays for indicating an image identification number. Therefore, the identification number can be recorded on the stimulable phosphor sheet simultaneously with recording of an X-ray image.

FIGS. 4A, 4B, and 4C show further embodiments of the lighttight envelope in accordance with the present invention.

In the embodiment of FIG. 4A, one of the two sides corresponding to sides 11 and 12 in the embodiment of FIGS 2 and 3 is open over the entire length, and a plastic fastener 15 is positioned at the completely open side. In this embodiment, since two sides of the lighttight envelope can be opened widely, insertion and removal of a stimulable phosphor sheet 30 are easier than in the embodiment of FIGS. 2 and 3. In the embodiment of FIG. 4A, a face-to-face fastener 16 for releasably engaging the upper sheet and the lower sheets with each other should preferably be positioned near the side provided with the plastic fastener 15. The lighttight envelope is heat-sealed at portions 17A and 17B.

In FIG. 4B, the lighttight envelope is heat-sealed only at a side 18B, and plastic fasteners 18A, 18A are positioned at the two sides adjacent the heat-sealed side 18B. In this embodiment, since the three sides other than the sealed side 18B can be opened completely, insertion and removal of the stimulable phosphor sheet becomes further easier. A face-to-face fastener 19 for releasably engaging the upper sheet and the lower sheet with each other is positioned at the center of the open side opposite to the sealed side 18B.

In the embodiment of FIG. 4C, the plastic fastener 15 in the embodiment of FIG. 4A is omitted. In this embodiment, though the degree of sealing becomes somewhat low, it is easy to open and close the lighttight envelope and to insert and remove the stimulable phosphor sheet 30. A face-to-face fastener 16A is positioned closer to the corner of the lighttight envelope than in the embodiment of FIG. 4A so that the stimulable phosphor sheet 30 does not come out of the lighttight envelope.

In the aforesaid embodiments of the lighttight envelope, plastic fasteners for fastening by engagement between protruded ribs and grooves are used for preventing the upper sheet and the lower sheet from disengaging. Instead of using the plastic fasteners, it is also possible to use ordinary bite type fasteners, simple hooks, or the face-to-face fasteners as described above.

Figure 3B:
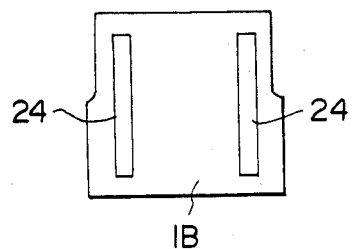
FIG. 3B is a rear view showing the lighttight envelope of FIG. 3, and FIG. 4A, 4B, and 4C are plan views showing further embodiments of the lighttight envelope in accordance with the present invention.

The lighttight envelope of the present invention can be conveyed at high speeds in the high-speed image recording apparatus by being releasably secured to the conveyor belt. For this purpose, as shown in FIG. 3B, faces 24, 24 of a face-to-face fastener provided with hook-like fibers or loop-like fibers may be positioned on the outer surface of the lower sheet 1B of the lighttight envelope, and the other faces of the face-to-face fastener for engagement with the faces 24, 24 may be positioned on the conveyor belt. Or, the lighttight envelope may be conveyed by being sandwiched between two belts.

We claim:

1. A lighttight envelope for high-speed conveyance of a stimulable phosphor sheet, which is fabricated of a flexible light shielding material and has a size sufficient to house the stimulable phosphor sheet therein, the lighttight envelope comprising:
(i) an upper sheet and a lower sheet having approximately identical rectangular shapes, said upper sheet and said lower sheet being closely contacted with each other at least at one side thereof and at a significant portion of an adjacent side to said one side, and open at one side opposite to said closely contacted side and at less than entire portions of two sides adjacent the ends of said opposite side up to such positions that access to a part of the stimulable phosphor sheet housed in the lighttight envelope is allowed, and
(ii) a means for preventing said upper sheet and said lower sheet from separating from each other, said means being positioned at a part of said opposite side.

2. A lighttight envelope as defined in claim 1 wherein said means for preventing said upper sheet and said lower sheet from separating from each other is a face-to-face fastener for fastening by engagement between a face provided with many fine hook-like fibers and a face providing with many fine loop-like fibers.

3. A lighttight envelope as defined in claim 1 wherein the inner surface of said lower sheet at said opposite side is provided with a flap facing inward of the lighttight envelope for preventing said stimulable phosphor sheet from coming out of the lighttight envelope.

4. A lighttight envelope as defined in claim 1 wherein an image identification number indicating section made of a material impermeable to a radiation is positioned on one of said upper sheet and said lower sheet.

5. A lighttight envelope for high-speed conveyance of a stimulable phosphor sheet, which is fabricated of a flexible light shielding material and has a size sufficient to house the stimulable phosphor sheet therein, the lighttight envelope comprising:
(i) an upper sheet and a lower sheet having approximately identical rectangular shapes, said upper sheet and said lower sheet being closely contacted with each other at least at one side thereof an open at least at one side opposite to said closely contacted side and at a portion of one of two sides adjacent the end of said opposite side up to such position that access to a part of the stimulable phosphor sheet housed in the lighttight envelope is allowed, and
(ii) a means for preventing said upper sheet and said lower sheet from separating from each other, said means being positioned at a part of said opposite side,
wherein one of said two sides adjacent the ends of said opposite side is open over the entire length, and a fastening means is positioned at the completely open side so as to extend from one end of said closely contacted side up to an intermediate point of said completely open side.

6. A lighttight envelope as defined in claim 5 wherein said means for preventing said upper sheet and said lower sheet from separating from each other is positioned near said side open completely and provided with said fastening means.

7. A lighttight envelope for high-speed conveyance of a stimulable phosphor sheet, which is fabricated of a flexible light shielding material and has a size sufficient to house the stimulable phosphor sheet therein, the lighttight envelope comprising:

(i) an upper sheet and a lower sheet having approximately identical rectangular shapes, said upper sheet and said lower sheet being closely contacted with each other at least at one side thereof and open at least at one side opposite to said closely contacted side that access to a part of the stimulable phosphor sheet housed in the lighttight envelope is allowed, and (ii) a means for preventing said upper sheet and said lower sheet from separating from each other, said means being positioned at a part of said opposite side, wherein said two sides adjacent the ends of said opposite side are open over the entire lengths, and a fastening means are positioned at the completely open side so as to extend from the end of said closely contacted side up to an intermediate point of said completely open sides.

8. A lighttight envelope as defined in claim 7 wherein said means for preventing said upper sheet and said lower sheet from separating from each other is positioned at the center of said opposite side.

9. A lighttight envelope for high-speed conveyance of a stimulable phosphor sheet, which is fabricated of a flexible light shielding material and has a size sufficient to house the stimulable phosphor sheet therein, the lighttight envelope comprising:

(i) an upper sheet and a lower sheet having approximately identical rectangular shapes, said upper sheet and said lower sheet being closely contacted with each other at least at one side thereof an open at least at one side opposite to said closely contacted side and at a portion of one of two sides adjacent the end of said opposite side up to such position so that access to a part of the stimulable phosphor sheet housed in the lighttight envelope is allowed, and (ii) a means for preventing said upper sheet and said lower sheet from separating from each other, said means being positioned at a part of said opposite side, wherein one of said two sides adjacent the ends of said opposite side is opened over the entire length, and said means for preventing said upper sheet and said lower sheet from separating from each other is positioned close to the corner between said completely open side and said opposite side.

* * * * *